United States Patent
Hao et al.

(10) Patent No.: US 9,532,210 B2
(45) Date of Patent: Dec. 27, 2016

(54) FILE DOWNLOADS USING BROADBAND WIRELESS MULTICAST

(71) Applicant: Verizon and Redbox Digital Entertainment Services, LLC, Basking Ridge, NJ (US)

(72) Inventors: Jack Jianxiu Hao, Acton, MA (US); Xuefeng Yao, Weston, MA (US); Yuhui Qian, Lexington, MA (US); Jian Huang, Sudbury, MA (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 168 days.

(21) Appl. No.: 14/090,119

(22) Filed: Nov. 26, 2013

(65) Prior Publication Data

US 2015/0149589 A1 May 28, 2015

(51) Int. Cl.
*H04L 29/08* (2006.01)
*H04W 8/22* (2009.01)
*H04L 1/00* (2006.01)
*H04L 29/06* (2006.01)

(52) U.S. Cl.
CPC .............. *H04W 8/22* (2013.01); *H04L 1/00* (2013.01); *H04L 67/06* (2013.01); *H04L 67/10* (2013.01); *H04L 63/123* (2013.01)

(58) Field of Classification Search
CPC ............................... H04W 8/22; H04L 29/08
USPC ....................................................... 709/219
See application file for complete search history.

(56) References Cited

U.S. PATENT DOCUMENTS

| 9,082,258 | B2* | 7/2015 | Ruppert | G07F 17/00 |
| 2007/0291674 | A1* | 12/2007 | Cheng | H04L 12/189 370/312 |
| 2009/0172552 | A1* | 7/2009 | Segel | H04N 5/44543 715/733 |
| 2009/0216859 | A1* | 8/2009 | Dolling | G06Q 30/02 709/218 |
| 2009/0260004 | A1* | 10/2009 | Datta | G06F 8/65 717/175 |
| 2009/0304115 | A1* | 12/2009 | Pittaway | H04H 60/14 375/340 |
| 2010/0312824 | A1* | 12/2010 | Smith | H04L 65/604 709/203 |

(Continued)

*Primary Examiner* — Thuong Nguyen
*Assistant Examiner* — Eric Moore (57) ABSTRACT

A user device receives, from an application server, a catalog of available content. The catalog of available content includes content available for delivery via multicast over a broadband wireless spectrum. The user device provides, to the application server, an indication of a user's selection of particular content available for delivery via multicast over the broadband wireless spectrum. The user device receives, from a content server, the particular content via a multicast transmission over the broadband wireless spectrum. The particular content includes multiple individual segment files. The user device detects a corrupted or missing segment file from the multiple individual segment files and requests, from the content server, a replacement segment file corresponding to the corrupt or missing segment file. The user device receives, from the content server, the replacement segment file via a unicast transmission to provide a complete set of segment files for the particular content.

20 Claims, 6 Drawing Sheets

(56) References Cited

U.S. PATENT DOCUMENTS

| | | | |
|---|---|---|---|
| 2011/0107379 A1* | 5/2011 | Lajoie | H04L 65/4076 725/87 |
| 2011/0135283 A1* | 6/2011 | Poniatowki | H04N 5/76 386/297 |
| 2012/0089699 A1* | 4/2012 | Cholas | H04L 12/2812 709/217 |
| 2012/0246717 A1* | 9/2012 | Burton | G06F 21/78 726/21 |
| 2013/0007226 A1* | 1/2013 | White et al. | 709/219 |
| 2013/0108048 A1* | 5/2013 | Grube et al. | 380/270 |
| 2013/0173817 A1* | 7/2013 | Field | H04L 65/4076 709/231 |
| 2013/0276065 A1* | 10/2013 | Kumar et al. | 726/3 |
| 2014/0163949 A1* | 6/2014 | Nazarian | H04N 21/432 704/2 |
| 2014/0365613 A1* | 12/2014 | Phillips et al. | 709/219 |

* cited by examiner

FILE DOWNLOADS USING BROADBAND WIRELESS MULTICAST

BACKGROUND

Over the top (OTT) video delivery is becoming increasingly popular for customers of service providers. However, bandwidth limitations, and particularly wireless bandwidth limitations, can hinder services when a large number of customers (e.g., in a local community) tries to download and watch the same movie or show using OTT video delivery. Unlike traditional TV systems, where movies are delivered using broadcasting signals, OTT service today uses dedicated data channels from a backend server to customer devices to delivery video. If there is popular content, such as a new show, a new movie, or a popular event, a majority of users may want to watch it, thus causing network connection congestion due to high demand for one-to-one data connections.

DETAILED DESCRIPTION OF PREFERRED EMBODIMENTS

The following detailed description refers to the accompanying drawings. The same reference numbers in different drawings may identify the same or similar elements.

Systems and methods described herein may use a cellular multicast channel to download popular content to mobile devices and provide for file correction of the multicast content through a one-to-one connection (e.g., unicast, local wireless network, etc.).

According to an implementation, a mobile device may schedule a video download (such as a new movie or recent television episode) that is available for multicast over a broadband wireless spectrum. The requested content may be downloaded to the mobile device via multicast at a time when the network load is low (e.g., overnight). The content may be downloaded as segment files and each segment may be verified for correctness by the mobile device based on a file map for the particular content. If a particular segment fails, then the mobile device may initiate a one-to-one connection (e.g., unicast over a cellular, Wi-Fi, Bluetooth, or wired connection) to replace the particular segment file from the content server.

Figure 1:
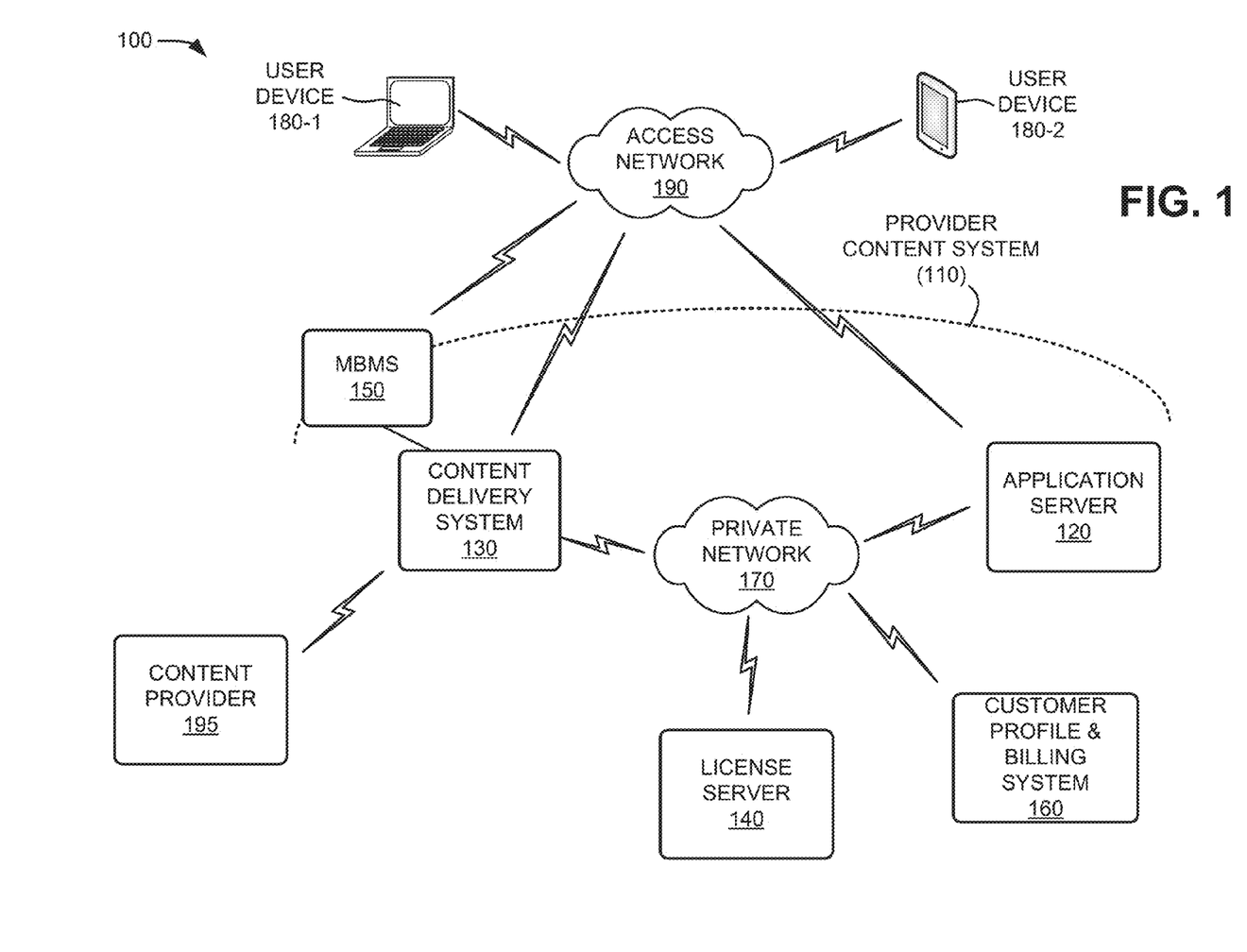
FIG. 1 is an exemplary network in which systems and/or methods described herein may be implemented.

FIG. 1 is an exemplary network 100 in which systems and/or methods described herein may be implemented. As illustrated, network 100 may include a provider content system 110, user devices 180-1 and 180-2 (collectively "user devices 180" and individually "user device 180") connected by an access network 190. As further shown, provider content system 110 may include an application server 120, a content delivery system 130, a license server 140, a multimedia broadcast multicast services (MBMS) device 150, a customer profile and billing system 160, and a private network 170. Network 100 may also include a content provider 195 that may or may not be part of provider content system 110.

Provider content system 110 may provide, among other services, digital video content available for downloading to user devices 180. For example, provider content system 110 may provide a service subscription that includes entitlements to access a particular library of media for downloading (e.g., provided from content delivery system 130). In one implementation, the library of downloadable media may include a subset from a larger collection of content. Interactions between application server 120 and user devices 180 may be performed, for example, using hypertext transfer protocol (HTTP) or secure HTTP (HTTPS) via access network 190.

Application server 120 may manage authentication, selection of content, authorization for downloading content, and/or purchase of content by a user of user devices 180. Application server 120 may also link to other backend systems to support applications residing on user devices 180. For example, application server 120 may communicate with customer profile and billing system 160 to authenticate a user who desires to purchase, rent, or subscribe to digital content (e.g., available through content delivery system 130).

In one implementation, application server 120 may permit user devices 180 to download a video application that enables a user to find content of interest and play downloaded or streaming content. Once user device 180 is registered via application server 120, the downloaded video application may enable user device 180 to present, to a user of user device 180, information received from application server 120 in an interactive format, to allow selection of particular content. Furthermore, the video application may coordinate with content delivery system 130 and license server 140 in authorizing user device 180 to access the selected content.

Application server 120 may provide a catalog of content (e.g., both digital content and/or physical assets) for a user of user devices 180 to consume (e.g., buy, rent, or subscribe). In one implementation, application server 120 may collect and/or present listings of content available to user devices 180. For example, application server 120 may receive digital content metadata, such as lists or categories of content, from content delivery system 130. Application server 120 may use the content metadata to provide currently-available content options to user devices 180.

Application server 120 may receive a login request associated with a user and may initiate a login process. Additionally, or alternatively, application server 120 may request/receive device information (e.g., a registration token) associated with user device 180 via content delivery system 130, and may compare the device information with stored information to validate/authenticate user device 180. Depending on the implementation, the stored information may reside in application server 120, customer profile and billing system 160, etc.

Content delivery system 130 may aggregate content and content metadata, process content, and distribute content. For example, content delivery system 130 may transcode content into a digital format suitable for consumption on particular user devices 180. In some implementations, content delivery system 130 may include a transcoder (hardware or software) to convert a video file from one format to another (e.g., from one bit rate to another bit rate, from one resolution to another, from one standard to another, from one file size to another, etc). Content delivery system 130 may also encrypt data.

License server 140 may issue, validate, and/or enforce digital rights management (DRM) licenses to a client, such as an application running on one of user devices 180. In some implementations, license server 140 may determine entitlement rights and/or other authorization parameters via interfaces of application server 120. Such information may be used to authorize a user to access particular content (e.g., issue a license to user device 180), and control/limit the number of concurrent viewing sessions and/or downloads for the user.

MBMS device 150 may deliver digital content from content delivery system 130 to user devices 180 via, for example, a content delivery network (CDN) which includes portions of provider content network 110 and portions of access network 190. MBMS device 150 may provide a point-to-multipoint interface that delivers multicast services to user devices 180. The MBMS device 150 may use IP multicast addresses for the IP flows that can be received simultaneously by users of user devices 180 who have subscribed to, and have joined, the particular multicast group associated with a content selection. In one implementation, MBMS device 150 may include a Broadcast-Multicast Service Center.

Customer profile and billing system 160 may store user profile information for users (e.g., users of user devices 180). The user profile information may include various information regarding a user, such as login information (e.g., a user identifier and a password), billing information, address information, types of services to which the user has subscribed, a list of digital/physical content purchased by the user, a list of video content rented by the user, a list of video content to which the user has subscribed, a user device identifier (e.g., a media player identifier, a mobile device identifier, a set top box identifier, a personal computer identifier) for user device 180, or the like. Application server 120 may use the user profile information from customer profile and billing system 160 to authenticate a user and may update the user profile information based on the user's activity.

Customer profile and billing system 160 may also manage charging users for services provided via provider content system 110. Customer profile and billing system 160 may perform credit card checks (e.g., for new subscriptions and/or trial subscriptions) and process payments for subscriptions with provider content system 110. For example, for new accounts, customer profile and billing system 160 may initiate credit card checks and receive credit card verification from an external billing entity, such as a credit card payment system (e.g., for a credit card account associated with the user) or a bank payment system (e.g., for a debit account associated with the user) associated with the user and/or user device 180, via an external payment API (not shown). For paying (e.g., non-trial) subscribers, customer profile and billing system 160 may also request and receive payments from the external billing entity (e.g., for monthly subscription fees, etc. associated with an account).

Private network 170 may include, for example, one or more private IP networks that use a private IP address space. Private network 170 may include a local area network (LAN), an intranet, a private wide area network (WAN), etc. In one implementation, private network 170 may implement one or more Virtual Private Networks (VPNs) for providing communication between, for example, any of application server 120, content delivery system 130, license server 140, and customer profile and billing system 160. Private network 170 may be protected/separated from other networks, such as public network 190, by a firewall. Although shown as a single element in FIG. 1, private network 170 may include a number of separate networks.

User device 180 may include a computational or communication device that is capable of communicating via access network 190. User device 180 may enable a user to view video content or interact with another user device 180 or a video display device (e.g., a set-top box and/or television). User device 180 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices.

In one implementation, user device 180 may include a video application that enables user device 180 to communicate with, for example, application server 120, content delivery system 130, and/or license server 140. The video application may permit a user of user device 180 to login to an account, access catalog information, submit an order for content to download, receive downloaded content, and/or manage correction of downloaded content.

Access network 190 may include a local area network (LAN), a wide area network (WAN), such as a cellular network, a satellite network, a fiber optic network, a private WAN, the public switched telephone network (PSTN), or a combination of the Internet and a private WAN, etc., that is used to transport data. Although shown as a single element in FIG. 1, access network 190 may include a number of separate networks that function to provide services to user devices 180. In one implementation, access network 190 may provide for multicast delivery of content from provider content system 110 to user devices 180 via a wireless network (e.g., a broadband wireless network, such as a long-term evolutions (LTE) network) and provide for unicast delivery of individual content segments from provider content system 110 to user devices 180.

Content provider 195 may include any type or form of content provider to provide content to provider content network 110 for distribution. For example, content provider 195 may include free television broadcast providers (e.g., broadcast providers, such as NBC, CBS, ABC, and/or Fox) and for-pay television broadcast providers (e.g., TNT, ESPN, HBO, Cinemax, CNN, etc.) that permit content to be streamed and/or downloaded. Content provider 195 may also include on-demand content providers (e.g., video on demand (VOD) providers, pay per view (PPV) providers, etc.).

In FIG. 1, the particular arrangement and number of components of network 100 are illustrated for simplicity. In practice there may be more application servers 120, content delivery systems 130, license servers 140, MBMS devices 150, customer profile and billing systems 160, user devices 180, networks 170/190, and/or content providers 195. Components of system 100 may be connected via wired and/or wireless links.

Figure 2:
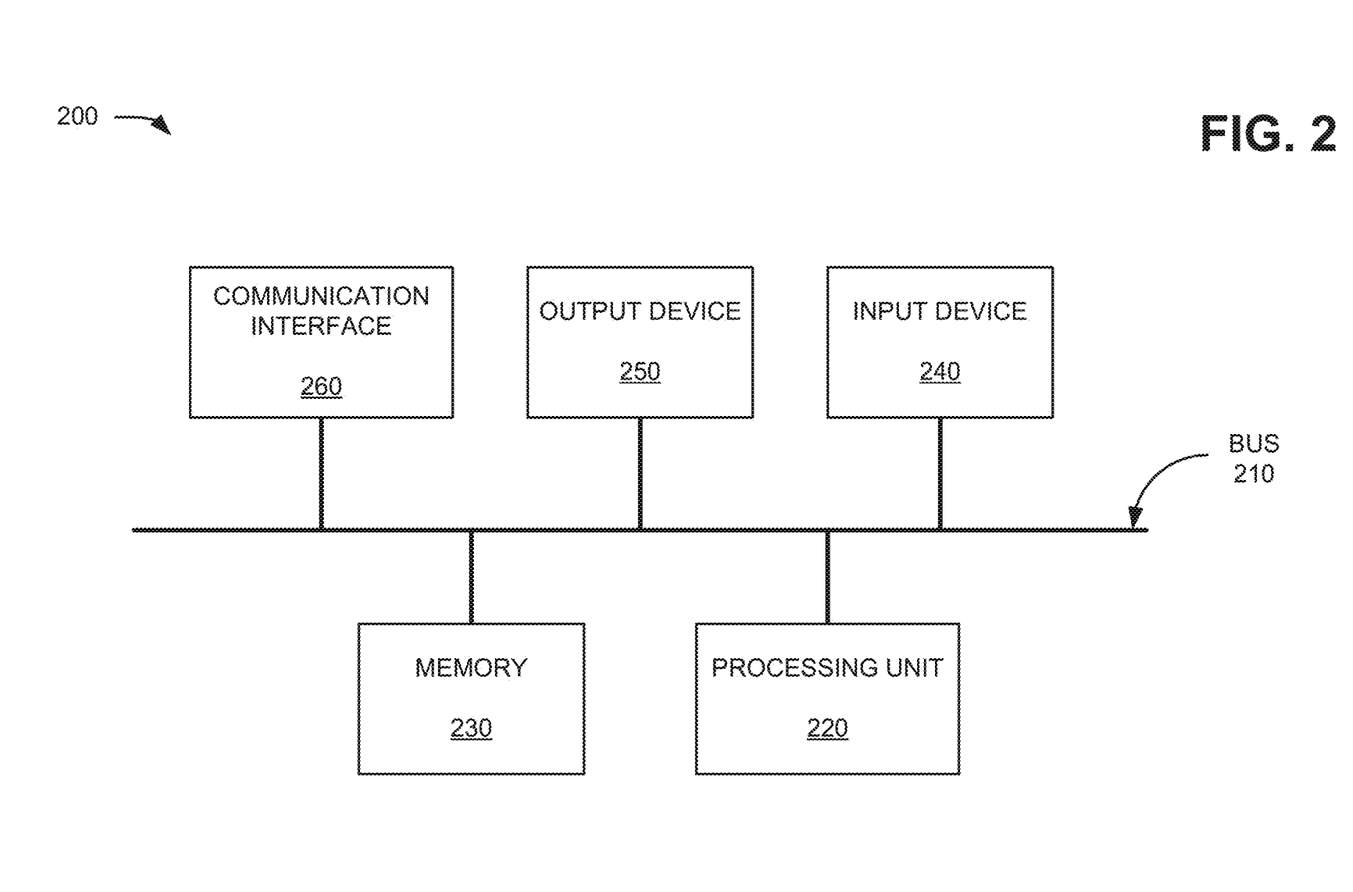
FIG. 2 is a block diagram of exemplary components of a device that may correspond to one of the devices of FIG. 1.

FIG. 2 is a diagram of exemplary components of a device 200. Each of application server 120, content delivery system 130, license server 140, MBMS device 150, customer profile and billing system 160, and user device 180 may be implemented/installed as software, hardware, or a combination of hardware and software, on its respective device 200. In one implementation, device 200 may be configured as a network device. In another implementation, device 200 may be configured as a computing device. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of system 100. Such other devices of system 100 each includes its respective communication interface 260 to achieve such communication.

As described herein, device 200 may perform certain operations in response to processing unit 220 executing software instructions contained in a computer-readable medium, such as memory 230. A computer-readable medium may include a tangible, non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than those depicted in FIG. 2. As an example, in some implementations, a display may not be included in device 200. In these situations, device 200 may be a "headless" device that does not include an input device. Alternatively, or additionally, one or more components of device 200 may perform one or more other tasks described as being performed by one or more other components of device 200.

Figure 3:
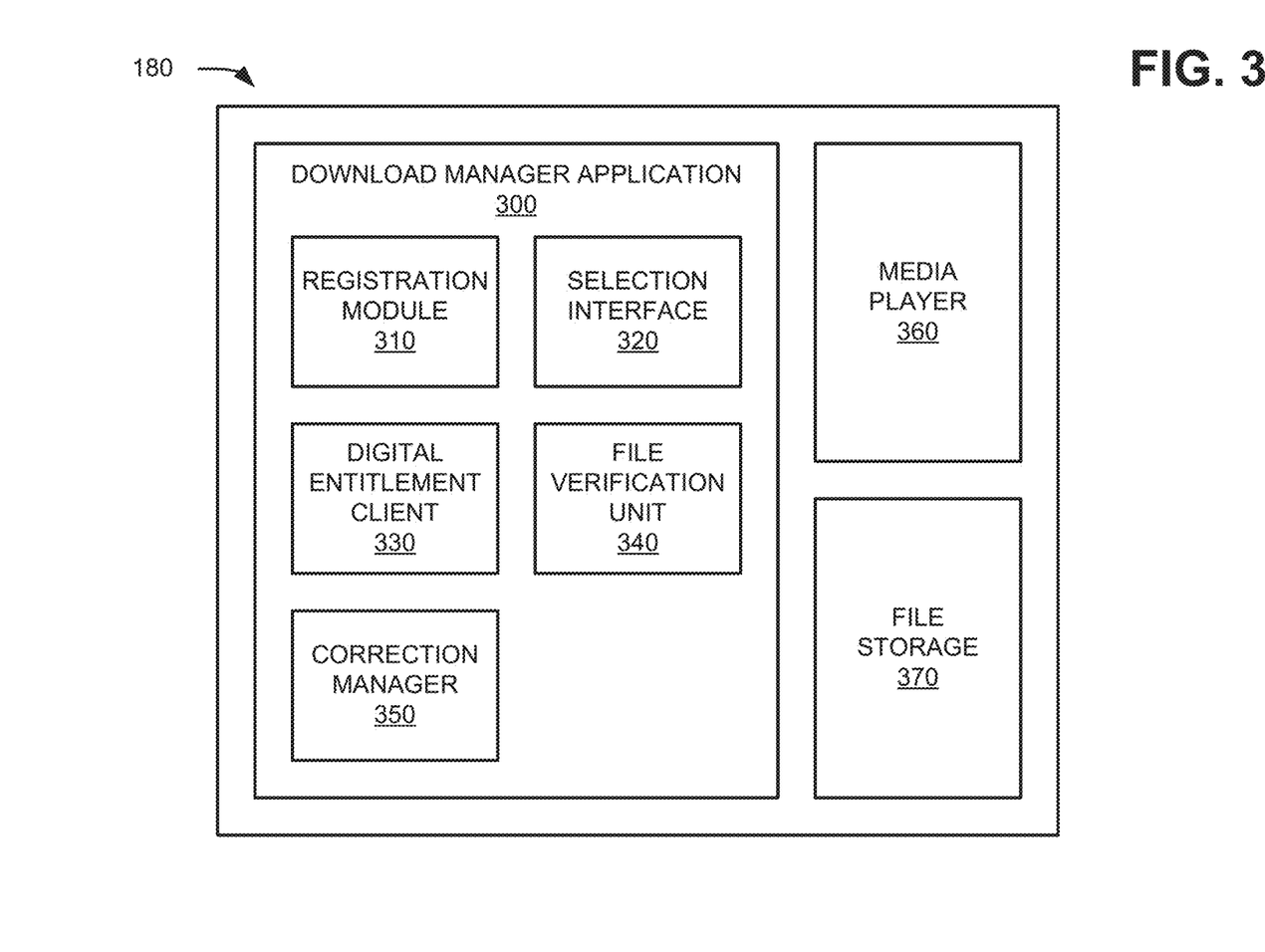
FIG. 3 is a block diagram of exemplary functional components of the user device of FIG. 1.

FIG. 3 is a block diagram of exemplary functional components of user device 180. The functions described in connections with FIG. 3 may be performed by one or more components of device 200 (FIG. 2). As shown in FIG. 3, user device 180 may include a video download manager application 300 that includes a registration module 310, a session setup or selection interface module 320, a digital entitlement client 330, a file verification unit 340, and a correction manager 350. User device 180 may also include a media player 360 and file storage 370 that may or may not be included as part of video download application 300.

Video download manager application 300 may include hardware and software components. The software components may be downloaded from application server 120, for example, when user device 180 contacts application server 120 to register for service or to request content from/via content delivery system 130. Video download application 300 may coordinate with application server 120 and content delivery system 130 to dynamically manage downloading, perform segment file verification, and request corrected/replacement segment files when necessary.

Registration module 310 may participate in registration of user device 180. For example, registration module 310 may initiate a registration of user device 180 with application server 120. To start a registration, registration module 310 may send a message to application server 120 to determine whether user device 180 is registered (e.g., recognized by application server 120 as a device that can receive content from content delivery system 130). The message may include an identifier, also known as a client ID, that is associated with and distributed with video download application 300. If user device 180 has not been registered with application server 120, registration module may receive an activation code and an activation uniform resource locator (URL) to allow a user of user device 180 to manually enter registration information for user device 180. Upon successful registration, application server 120 may return a globally-unique registration token to registration module 310. Registration module 310 may store the registration token, the activation code, and/or the client ID for subsequent login attempts.

Selection interface 320 may provide a user interface to view catalog items, may transmit user selections to application server 120, schedule receiving of multicast downloads, etc. Selection interface 320 may enable a user to request a list of available content (e.g., digital content) and select from the list of available content. When a user selects particular content via selection interface 320, application server 120 may begin to download metadata and/or download information (e.g., a particular time, format, and/or URL for a multicast download) for the selected content for use by video download application 300. Selection interface 320 may start the download process by working with lower layer application programmable interfaces (APIs) to connect to the multicast channel and be ready to receive data at the scheduled multicast time.

In another implementation, selection interface 320 may also include an account login interface. For example, selection interface 320 may request, from application server 120, a list of content available for downloading and may present the list of content to a user of user device 180. Selection interface 320 may include an interactive client interface that allows a user to provide input, such as user passwords, preferences, and selections from the list of available content. In one implementation, selection interface 320 may indicate a user's selection (e.g., from the catalog) to application server 120 and, in return, receive specific information to obtain the selected content via multicast.

Digital entitlement client 330 may acquire licenses for content that are selected by a user for downloading or playing at user device 180. In one example, digital entitlement client 330 may send a request for a license to license server 140. The request may include all or a portion of device registration data (e.g., registration token) from registration module 310. If digital entitlement client 330 receives a license file for the selected content from license server 140, digital entitlement client 330 may store the license file. The license file may include a decryption key, for example, to decrypt the selected content in instances where the particular content has been encrypted for to avoid unauthorized copying or for other reasons.

File verification unit 340 may receive content downloads (e.g., from content delivery system 130 via MBMS 150) in segments (or chunks). For each segment, file verification unit 340 may perform a checksum or signature verification. In one implementation, file verification unit 340 may use metadata received in response to selection of particular content via selection interface 320 to confirm all segments for a particular content selection are received. That is, signature or checksum information can be delivered using a normal unicast channel or Wi-Fi connection to application server 120 through a landline Internet connection. In another implementation, a file map or other metadata may be provided as part of the multicast download of the selected content to use in confirming that all segments for a particular content selection are received. If a particular segment is missing or incomplete, file verification unit 340 may signal correction manager 350 to obtain the missing or incomplete segment. For example, file verification unit 340 may create a log of missing segment(s) from the multicast download and provide the log to correction manager 350. File verification unit 340 may store verified chunks in file storage 370 or another memory location of user device 180.

Correction manager 350 may receive a failure indication (e.g., from file verification unit 340) that one or more segments is missing/incomplete from selected content that was provided via multicast download. In response to the failure indication, correction manager 350 may request a unicast download of the appropriate segments. For example, if file verification unit 340 reports a failed segment, correction manager 350 may submit a request to content delivery service 130 to obtain the failed segment. In one implementation, correction manager 350 may obtain a URL, through which to generate a request for the failed segment, from a file map or other metadata associated with the selected content. For example, metadata obtained by selection interface 320 and/or file verification unit 340 may include a URL that correction manager may to use to obtain individual segments associated with the selected content. Correction manager 350 may obtain the appropriate segment via the unicast channel to repair the downloaded multicast content. Correction manager 350 may store corrective segments in file storage 370, or another memory location of user device 180, along with the verified segments stored by file verification unit 340.

Media player 360 may decode and play content that is downloaded from content delivery service 130. Media player 360 may output the decoded video to output components (e.g., a display, speakers, etc.) of output device 250 of user device 180.

File storage 370 may store the set of segment files for selected content that were received via multicast and (if necessary) unicast download. In one implementation, file storage may implement segment file deletions (e.g., after all segments are viewed, after an expiration time, etc.) in accordance with a user's particular subscription terms.

Although FIG. 3 shows exemplary functional components of user device 180, in other implementations, user device 180 may include fewer components, different components, or additional components than those depicted in FIG. 3. For example, user device 180 may include a user profile component to track user viewing history, preferences, and/or account activity. Alternatively, or additionally, one or more functional components of user device 180 may perform one or more other tasks described as being performed by one or more other functional components of user device 180.

Figure 4:
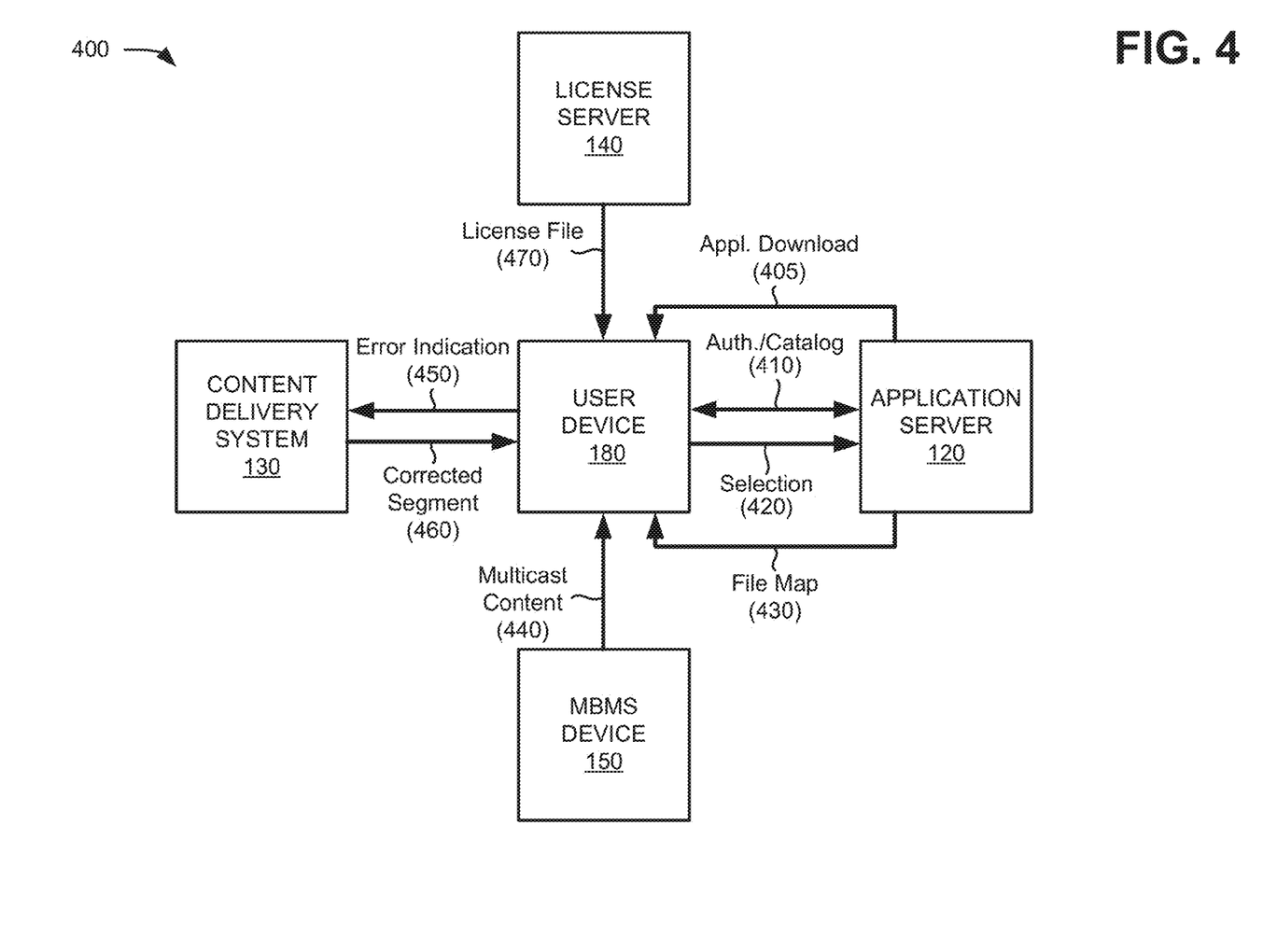
FIG. 4 is a block diagram of exemplary communications among devices, servers and systems in a portion of the network of FIG. 1.

FIG. 4 is a diagram of exemplary communications for a portion 400 of network 100. Communications in FIG. 4 may represent communications for implementing a multicast download over LTE from provider content system 110. As shown in FIG. 4, network portion 400 may include application server 120, content delivery system 130, license server 140, MBMS device 150, and user device 180. Application server 120, content delivery system 130, license server 140, MBMS device 150, and user device 180 may include features described above in connection with, for example, FIGS. 1-3.

As shown in FIG. 4, user device 180 may receive an application download 405 from application server 120. Application download 405 may include, for example, video download application 300, media player 360, and/or other components. In one implementation, application download 405 may be initiated during a registration process of user device 180 with application server 120 to subscribe for services from provider content network 110.

User device 180 may also be authenticated and receive a catalog of content, as indicated by reference number 410. For example, user device 180 (e.g., selection interface 320) may provide login credentials to application server 120. Application server 120 may verify the login credentials and, if approved, may provide a catalog of available content to user device 180. The catalog may include scheduled content, such as, for example, a popular show, a popular movie or a major event, that is projected to have high demand at the time the schedule content becomes available.

User device 180 may receive a user's selection of particular scheduled content and may provide an indication of the selection 420 to application server 120. Application server 120 may receive selection 420 and, in response, provide a file map 430 to user device 180. File map 430 may include metadata about the selected content including, for example, the number of segment files, the file format, the size of the complete file set, a URL for obtaining, corrective segments, etc. In another implementation, information of file map 430 may instead be included with each available content item as part of the catalog listing (e.g., reference 410). Assuming the selection 420 is for a multicast channel download, user device 180 may schedule the download. The download may be scheduled, for example, at provider content network 110 according to the program broadcast time and/or identification of non-peak use times (e.g., for access network 190, or portions thereof).

At the scheduled time, MBMS device 150 may begin distributing multicast content 440 to particular devices (including user device 180) that have selected the particular scheduled content. In one implementation, provider content network 110 may provide a separate multicast channel of the same content for different content formats. For example, multicast content 440 may include a file download that is compatible with a platform (e.g., a particular combination of hardware software) of some user devices 180 (e.g., user devices with an Android™ platform), while another multicast download may be used for other types of user devices 180 (e.g., user devices with an iOS™ platform). The different multicast content downloads may be scheduled for distribution simultaneously or at separate times.

Multicast content 440 may be distributed as discrete segment files. User device 180 (e.g., file verification unit) may receive the individual segment files, verify each segment file, and, store each segment file to a local memory (e.g., file storage 370). In one implementation, each segment file of multicast content 440 may be encrypted and require a license/decryption key (not shown) to allow user device 180 to present the content.

If user device 180 detects that a particular segment file of multicast content 440 is corrupted or missing (e.g., based on file map 430 or other content metadata), user device 180 may initiate a correction by sending an error indication 450 to content delivery system 130. Error indication 450 may be provided to content delivery system 130 using, for example, a one-to-one connection. The one-to-one connection may be initiated using a URL or another type of link that is included in file map 430 or other content metadata associated with selection 420. In one implementation, error indication 450 may include, for example, a unique segment file identifier that enables content delivery system 130 to identify the particular segment file that was identified as corrupted or missing.

In response to error indication 450, content delivery system 130 may provide a corrected segment 460 to user device 180. Corrected segment 460 may include, for example, a segment file to replace the particular segment file indicated in error indication 450. Corrected segment 460 may be provided to user device 180, for example, via unicast delivery or a one-to-one communication session. User device 180 may receive corrected segment 460 and replace the particular segment file that was corrupted or missing with corrected segment file 460.

Separate from delivery of multicast content 440, license server 140 may provide a license file 470 to user device 180. For example, license file 470 may be delivered using a different (e.g., non-multicast) channel when a user starts to view/consume the segment files from the local memory (e.g., file storage 370). License file 470 may include, for example, information to unlock encrypted content for user device 180 (e.g., media player 360) to play.

Although FIG. 4 shows exemplary communications within network portion 400, in other implementations, network portion 400 may include fewer communications, different communications, and/or additional communications than those depicted in FIG. 4. Alternatively, or additionally, one or more components of network portion 400 may perform one or more other tasks described as being performed by one or more other components of network portion 400.

Figure 5:
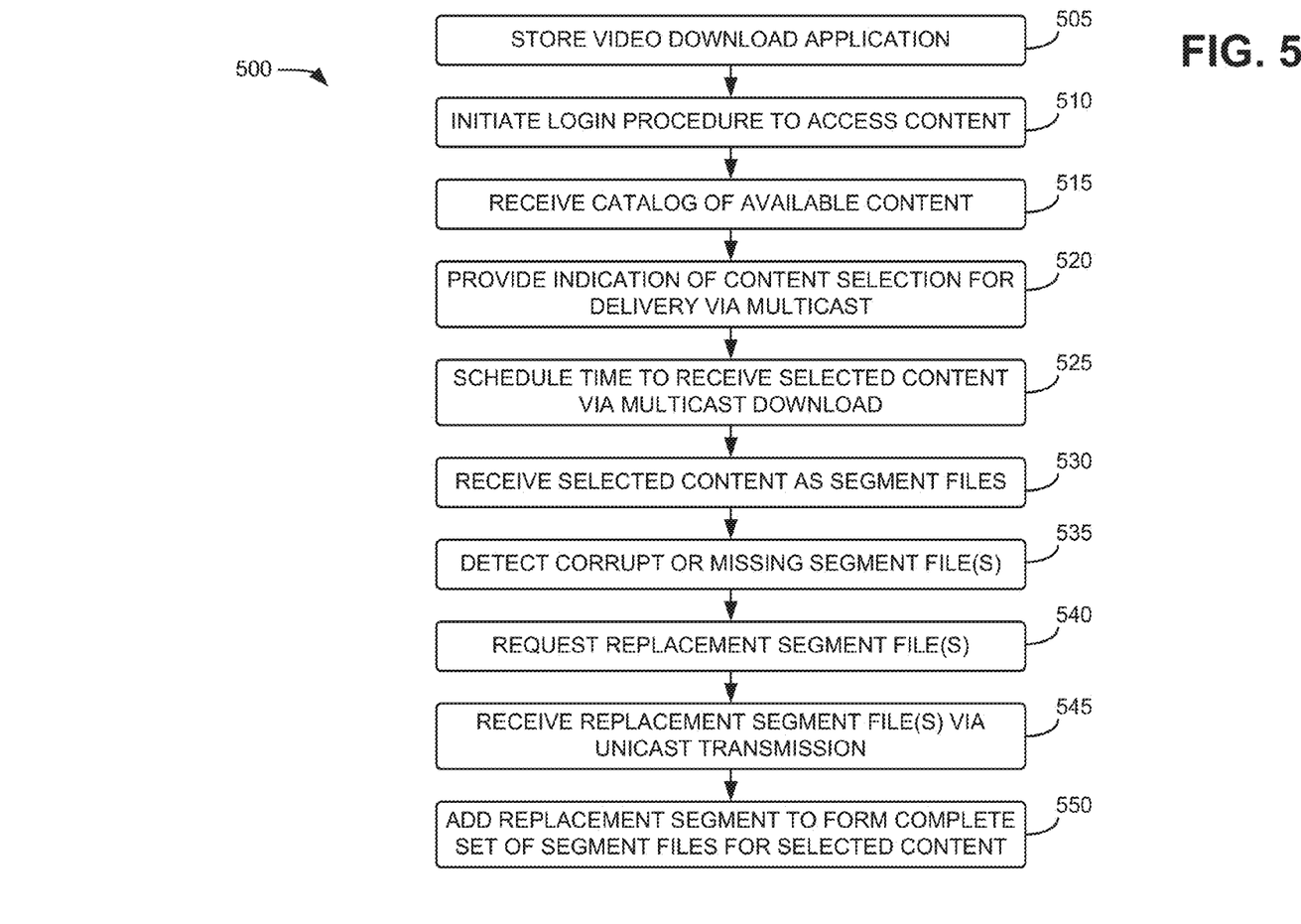
FIG. 5 is a flow diagram of an exemplary process for receiving downloaded content using multicast over a broadband wireless spectrum, and using unicast as may be needed, according to an implementation described herein.

FIG. 5 is a flow diagram of an exemplary process 500 for receiving downloaded content using multicast over a broadband wireless spectrum, and using unicast as may be needed. In one implementation, process 500 may be performed by user device 180. In other implementations, process 500 may be performed by user device 180 and one or more devices from provider content system 110.

Process 500 may include storing a video download application (block 505), initiating a login procedure to access content (block 510), and receiving a catalog of available content (block 515). For example, user device 180 may receive and store video download application 300. Video download application 300 may include a user interface to permit a user to login to application server 120. Upon a successful login process, application server 120 may provide a catalog of content available for selection by the user.

Process 500 may also include providing an indication of a content selection for delivery via multicast (block 520) and scheduling a time to receive the selected content via the multicast download (block 525). For example, user device 180 may provide, to the application server 120, an indication of a user's selection of particular content available for delivery via multicast over a broadband wireless spectrum (e.g., an LTE network). Based on the information from the catalog, for example, user device 180 may schedule a time to receive the particular content from content delivery system 130 via the multicast transmission. In one implementation, user device 180 may also receive a file map for the particular content.

Process 500 may also include receiving the selected content as segment files (block 530). For example, user device 180 may receive, from content delivery system 130, the particular content via a multicast transmission over the broadband wireless spectrum. The particular content may include multiple individual segment files. In one implementation, the multicast transmission may include the particular content in a format configured specifically for a platform of user device 180.

Process 500 may further include detecting one or more corrupt (i.e., corrupted) or missing segment files (block 535), and requesting replacement segment files for the one or more corrupt or missing segment files (block 540). For example, user device 180 may detect a corrupt or missing segment from the multiple individual file segments received from the multicast transmission. User device 180 may request a replacement segment, corresponding to the corrupt or missing segment, from content delivery system 130. The request may be directed to content delivery system 130 using a URL obtained, in either of metadata associated with the catalog of available content or the file map. The request may include, among other information, a unique identifier for the particular corrupt or missing segment.

Process 500 may additionally include receiving the one or more replacement segment files via a unicast transmission (block 545), and adding the one or more replacement segment files to form a complete set of segment files for the selected content (block 550). For example, user device 180 may receive the replacement segment file from content delivery system 130 via a unicast transmission. User device 180 may add the replacement segment file to the multiple individual file segments so as to form a locally-stored set of file segments for the particular content that can be viewed at any time by the user.

Figure 6:
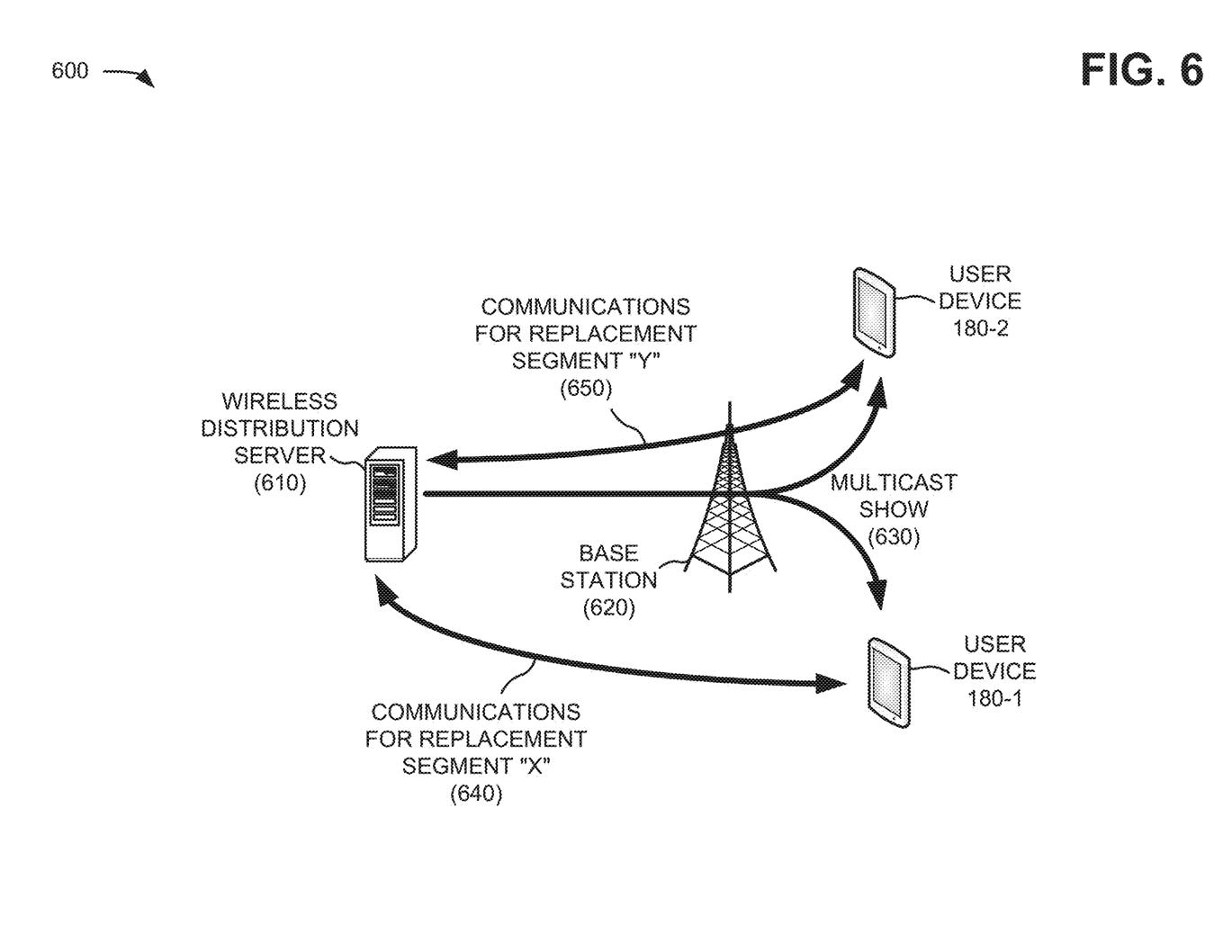
FIG. 6 is a diagram of an exemplary use case according to an implementation described herein.

FIG. 6 provides a diagram of an exemplary use case according to implementations described herein. Assume there is a popular show that will available for viewing via provider content network 110. For example, the show may be a season finale of a broadcast television series that will be made available for on-demand viewing three hours after the original broadcast. Network administrators (e.g., of provider content network 110) can predict that customers are going to be anxious to watch show right away and that the volume of requests would cause network congestion if a traditional one-to-one video-on-demand approach were used.

Referring to FIG. 6, a wireless distribution server 610 (which may be, for example, a device in content delivery system 130 and/or MBMS 150) may be configured to provide the show (e.g., in a format for a particular mobile platform) for distribution via LTE multicast at the time the show is made available for on-demand viewing (e.g., three hours after the original broadcast). The LTE multicast may include distribution via numerous base stations (Evolved Node Bs or eNodeBs), such as base station 620. Devices, such as user devices 180-1 and 180-2 can download the show by tuning to the broadcast channel to receiving data chunk by chunk (e.g., segment files) at a specific time.

The title, format, multicast download time, a URL for corrections, and other metadata may be published to the content catalog that is made available to users via application server 120 (not shown in FIG. 6), so that users can browse, search, and bookmark to download/watch. An application (e.g., video download application 300) on user devices 180 can schedule the download for the show according to the scheduled availability times. As another example, if a new movie is coming, provider content network 110 can allow users to bookmark the movie for download when it is available.

Assume, in the example, of FIG. 6, that user devices 180-1 and 180-2 have the same operating platform and have both been scheduled (e.g., using their respective download manager applications 300) to download the show when it becomes available. At the scheduled availability time, wireless distribution server 610 may provide the multicast show 630 as separate segment files. User devices 180-1 and 180-2 (e.g., using their respective download manager applications 300) simultaneously receive and download the show.

Assume further that user device 180-1 downloads one segment file, "X," from multicast show 630 that is corrupted and that user device 180-2 downloads a different segment file "Y," from multicast show 630 that is corrupted. As indicated by reference 640, user device 180-1 may use the URL for corrections (e.g., as included in the catalog information or a separate file map 430) to initiate communications with wireless distribution server 610. Wireless distribution server 610 may provide a unicast replacement segment file "X" to user device 180-1 to complete the show download to user device 180-1. As shown in FIG. 6, communications 640 may include a different type of communications medium (e.g., Wi-Fi, wired, etc.) than used for receiving multicast show 630 thereby avoiding need for, and use of, base station 620. Similarly, as indicated by reference 650, user device 180-2 may use the same URL for corrections to initiate communications with wireless distribution server 610. Wireless distribution server 610 may provide a unicast replacement segment file "Y" to user device 180-2 to complete the show download to user device 180-2. In contrast with user device 180-1, user device 180-2 may use the same type of communications medium (e.g., cellular service through base station 620) as used for receiving multicast show 630.

Once the downloaded show is saved onto either of user devices 180-1 and 180-2, a notification that the download is successful (or failed) can be sent to that user's email or a message center associated with video download application 300. If successful, a user can play the show at any time from the local memory of its user device 180.

After a user watches the downloaded content, the content can be deleted from the memory of user device 180. In one implementation, the viewed content may be deleted automatically in a manner similar to how a DVR movie is deleted from its recording memory after a user's review. In other implementations, the user may have the option to keep some content for future viewing. However, the user may not be able to receive additional content if the memory of user device 180 is full.

According to systems and methods described herein a user device may receive, from an application server, a catalog of available content. The catalog of available content may include content available for delivery via multicast over a broadband wireless spectrum, such as LTE multicast. The user device may provide, to the application server, an indication of a user's selection of particular content available for delivery via multicast over the broadband wireless spectrum. The user device may receive, from a content server, the particular content via a multicast transmission over the broadband wireless spectrum. The particular content may include multiple individual segment files. The user device may detect a corrupt or missing segment file from the multiple individual segment files and may request, from the content server, a replacement segment file corresponding to the corrupt or missing segment file. The user device may receive, from the content server, the replacement segment file via a unicast transmission to provide a complete set of segment files for the particular content.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 5, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
    conducting, by a video download application of a user device, a login procedure with an application server to access available content, wherein the login procedure includes sending a device registration token to the application server;
    receiving, by the video download application and from the application server, a catalog of the available content, wherein the catalog of the available content includes a list of digital video content available for delivery from a provider network via multicast over a broadband wireless spectrum;
    providing, by the video download application and to the application server, an indication of a user's selection of particular digital video content available for delivery via multicast over the broadband wireless spectrum;

receiving, by the video download application after the login procedure and from the application server, download information, responsive to the user's selection, wherein the download information includes:
- a uniform resource locator (URL) for a multicast channel that delivers the particular digital video content from a content server over the broadband wireless spectrum,
- multicast availability times, wherein the multicast availability times correspond to non-peak use times for an access network for the user device,
- a file map for confirming all segments for the particular digital video content are received, and
- a URL for corrections that is different than a URL for the multicast channel;

scheduling, by the video download application and based on the download information, receiving of the particular digital video content from the content server via the multicast channel during one of the multicast availability times;

automatically connecting, by the video download application and via an application programming interface (API), to the multicast channel prior to the scheduled one of the multicast availability times;

receiving, by the video download application and from a content server, the particular digital video content via the multicast channel, wherein the particular digital video content is encrypted and wherein the particular digital video content includes multiple individual segment files;

detecting, by the video download application and by using the file map, a corrupt or missing segment file from the multiple individual segment files;

requesting, by the video download application and via the URL for corrections, a replacement segment file corresponding to the corrupt or missing segment file;

receiving, by the video download application and from the content server, the replacement segment file via a unicast transmission;

replacing, by the user device, the corrupt or missing segment file with the replacement segment file to form a locally-stored set of file segments for the particular digital video content;

receiving, by the user device and after the replacing, user input to request presentation of the particular digital video content;

sending, by the video download application and in response to the user input, a request, to a license server, for a license file for the particular digital video content, wherein the request for the license file includes the device registration token; and receiving, by the video download application and based on the device registration token, the license file, wherein the license file includes a decryption key to unlock encrypted content in the locally-stored set of file segments for the particular digital video content.

2. The method of claim 1, further comprising:
storing, on the user device, the video download application.

3. The method of claim 1, further comprising:
storing, in the user device, the device registration token.

4. The method of claim 1, wherein the multicast availability times are scheduled to provide the particular digital video content, configured for different user device platforms, at different times.

5. The method of claim 1, wherein the particular digital video content includes the particular digital video content in format configured for a platform of the user device.

6. The method of claim 1, wherein receiving the file map further comprises:
receiving the file map within the catalog of the available content.

7. The method of claim 1, wherein the requesting the replacement segment file includes:
providing a unique identifier for the corrupt or missing segment file.

8. The method of claim 1, further comprising:
storing, by the user device and in a local memory, the locally-stored set of segment files for the particular digital video content.

9. The method of claim 1, wherein the delivery via multicast over a broadband wireless spectrum includes delivery via one or more eNodeBs, and wherein receiving the file map includes receiving the file map via a unicast channel.

10. The method of claim 1, wherein receiving the file map includes receiving the file map via one of a wired or Wi-Fi connection.

11. A device, comprising:
a network interface to communicate with a remote system;
a memory for storing instructions to be executed by one or more processors; and
the one or more processors configured to execute the instructions to:
- conduct a login procedure with an application server to access available content, wherein the login procedure includes sending a device registration token to the application server,
- receive, from the application server, a catalog of the available content, wherein the catalog of the available content includes a list of digital video content available for delivery from a provider network via multicast over a broadband wireless spectrum,
- provide, to the application server, an indication of a user's selection of particular digital video content available for delivery via multicast over the broadband wireless spectrum,
- receive, after the login procedure and from the application server, download information, responsive to the user's selection, wherein the download information includes:
  - a uniform resource locator (URL) for a multicast channel that delivers the particular digital video content from a content server over the broadband wireless spectrum,
  - multicast availability times, wherein the multicast availability times correspond to non-peak use times for an access network for a user device receiving the particular digital video content,
  - a file map for confirming all segments for the particular digital video content are received, and
  - a URL for corrections that is different than a URL for the multicast channel,
- schedule, based on the download information, receiving of the particular digital video content from the content server via the multicast channel during one of the multicast availability times,
- automatically connect, via an application programming interface (API), to the multicast channel prior to the scheduled one of the multicast availability times, receive, from a content server, the particular digital video content via a multicast channel, wherein the particular digital video content is encrypted and wherein the particular digital video content includes multiple individual segment files, detect, using the file map, a corrupt or missing segment from the multiple individual segment files, request, from the content server, a replacement segment file corresponding to the corrupt or missing segment file, receive, from the content server, the replacement segment file via a unicast transmission, replace the corrupt or missing segment file with the replacement segment file to form a locally-stored set of file segments for the particular digital video content, receive, after the replacing, user input to request presentation of the particular digital video content, send, in response to the user input, a request, to a license server, for a license file for the particular digital video content, wherein the request for the license file includes the device registration token, and receive, based on the device registration token, the license file, wherein the license file includes a decryption key to unlock encrypted content in the locally-stored set of file segments for the particular digital video content.

12. The device of claim 11, wherein the one or more processors are further configured to execute the instructions to:
store the device registration token.

13. The device of claim 11, wherein the one or more processors are further configured to execute the instructions to:
present, to a user, the particular digital video content from the locally-stored set of segment files, and
delete, from the memory, the locally-stored set of segment files after presentation to the user.

14. The device of claim 11, wherein the file map includes a number of segment files for the particular digital video content, and a file format of the particular digital video content.

15. The device of claim 11, wherein, when requesting the replacement segment file, the one or more processors are further configured to execute the instructions to:
provide, to the content server and via the URL, a unique identifier for the corrupt or missing segment file.

16. The device of claim 15, wherein, when receiving the download information, the one or more processors are further configured to execute the instructions to:
receive the download information via a unicast cellular connection.

17. The device of claim 11, wherein, when receiving the download information, the one or more processors are further configured to execute the instructions to:
receive the download information via one of a wired or a Wi-Fi connection.

18. A non-transitory computer-readable medium, storing instructions executable by one or more processors, the non-transitory computer-readable medium comprising one or more instructions to:
conduct a login procedure with an application server to access available content, wherein the login procedure includes sending a device registration token to the application server;

receive, from the application server, a catalog of the available content, wherein the catalog of the available content includes content available for delivery from a provider network via multicast over a broadband wireless spectrum;

provide an indication of a user's selection of particular digital video content available for delivery via multicast over the broadband wireless spectrum;

receive, after the login procedure and from the application server, download information, responsive to the user's selection, wherein the download information includes:
a uniform resource locator (URL) for a multicast channel that delivers the particular digital video content from a content server over the broadband wireless spectrum,
multicast availability times, wherein the multicast availability times correspond to non-peak use times for an access network for a user device receiving the particular digital video content,
a file map for confirming all segments for the particular digital video content are received, and
a URL for corrections that is different than a URL for the multicast channel;

schedule, based on the download information, receiving of the particular digital video content from the content server via the multicast channel during one of the multicast availability times;

automatically connect, via an application programming interface (API), to the multicast channel prior to the scheduled one of the multicast availability times;

receive the particular digital video content via a multicast channel, wherein the particular digital video content includes multiple individual segment files;

detect, using the file map, a corrupt or missing segment from the multiple individual segment files;

request a replacement segment file corresponding to the corrupt or missing segment file;

receive the replacement segment file via a unicast transmission;

replace the corrupt or missing segment file with the replacement segment file to form a locally-stored set of file segments for the particular digital video content;

receive, after the replacing, user input to request presentation of the particular digital video content;

send, in response to the user input, a request, to a license server, for a license file for the particular digital video content, wherein the request for the license file includes the device registration token; and receive, based on the device registration token, the license file, wherein the license file includes a decryption key to unlock encrypted content in the locally-stored set of file segments for the particular digital content.

19. The non-transitory computer-readable medium of claim 18, further comprising one or more instructions to:
present, to a user, the particular digital video content from the locally-stored set of file segments.

20. The non-transitory computer-readable medium of claim 19, further comprising one or more instructions to:
generate a notification, for the user, that the particular digital video content was successfully received, after receiving the replacement segment file.

* * * * *